Patented May 17, 1932

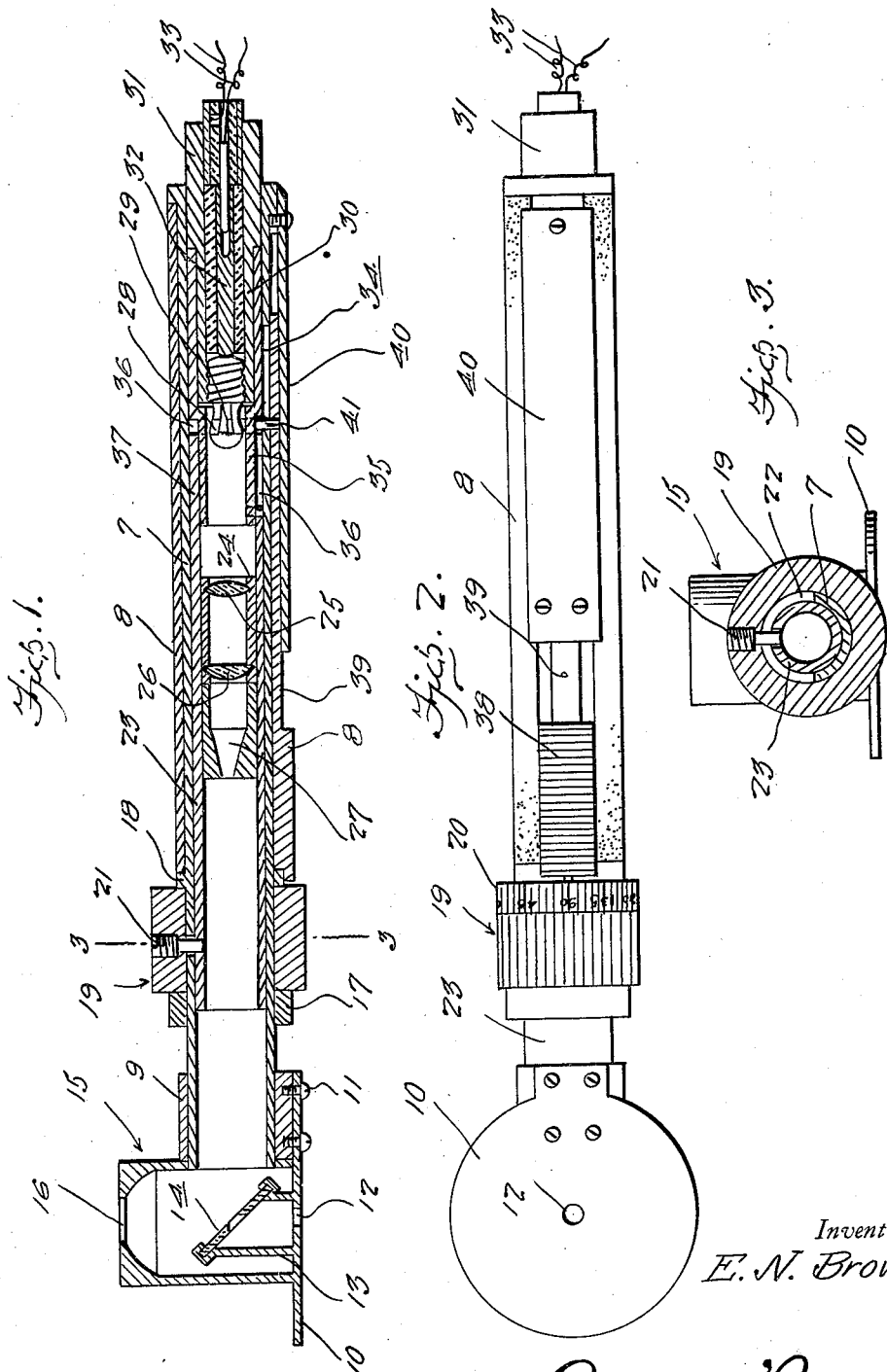

1,858,949

UNITED STATES PATENT OFFICE

ERNEST N. BROWN, OF JOHNSTON CITY, ILLINOIS

REFRACTOMETER

Application filed February 20, 1928. Serial No. 255,768.

This invention relates to an improved optical instrument which I have chosen to designate a refractometer but which is frequently referred to in the art as a skiascope, retinoscope, or the like.

The invention has more particular reference to an instrument of this class which can be used in a dependable manner for measuring errors of refraction of the human eye through the medium of a hairline streak of light to give the exact axes in an astigmatism.

I am aware of the fact that various types of instruments have been provided for this purpose and that it is generically old in the art to utilize a source of light in an appropriate handle casing which provides a beam of light projected through a lens and onto an appropriately inclined mirror from which it is in turn projected against the eye of the patient for diagnostic purposes.

It follows that the principal feature characterizing the improved invention is the means provided whereby the direction and intensity of the projected streak of light can be accurately regulated to suit the case at hand.

The particular details and their association and arrangement will become more readily apparent from the following description and drawings.

In the drawings:—

Figure 1 is a longitudinal section through an optical instrument constructed in accordance with the present invention showing one embodiment, thereof.

Fig. 2 is a side elevational view of the same, and

Fig. 3 is a cross section taken approximately upon the line of 3—3 of Fig. 1.

With reference more in detail to the drawings, it will be seen that the device, which I prefer to call a refractometer includes a tubular handle 7 on one end of which is a ferrule 9 to which a disc-like head 10 is fastened as at 11. Integral with the head 10 is a hollow housing 15 provided at the top thereof with an opening 16 to permit light beams or streaks of light to be projected therethrough.

Arranged within the housing 15 is an obliquely disposed mirror 14 supported on a suitable mounting 13 integral with the disc head 10. The disc head 10 is provided with a peep hole 12 in alinement with an opening formed in the center of the mirror 14.

The tubular handle 7 about that end portion thereof remote from the housing 15 has disposed a slit tubular hand grip 8. Between the housing 15 and adjacent end of hand grip 8 is an annular flange 18 and retained on the handle for rotation relative thereto is a finger grip 19, the latter being retained between the flange 18 and a collar 17 disposed about the handle.

Finger grip 19 is provided with an annular series of graduations against which may be read a suitable pointer provided on flange 18. Rotatably mounted in the handle 7 is an elongated sleeve 23 that adjacent its forward end is provided with an opening for receiving one end of a set screw 21 extending into the handle through a suitable slot 22 provided therefor in the handle. The set screw 21 is threaded within the finger grip 19 so that obviously upon rotation of the finger grip, the sleeve 23 will be likewise rotated in a corresponding direction.

Arranged within an intermediate portion of sleeve 23 is a lens carrier 24 within which is arranged a spherical lens 25 and a cylindrical lens 26, the lenses being in axial alinement one with the other. Adjacent its forward end, the bore of the lens carrier is restricted as at 27 for confining or restricting the streak of light projected from the lenses 25, 26.

A bushing 34 is provided with a reduced extension 35 fitting within one end of sleeve 23 in alinement with lens carrier 24. For rotation with the sleeve 23, the bushing is operatively connected thereto through the medium of a pin 37 carried by the reduced end 35 of the bushing and receivable in a slot 36 formed in said sleeve 23.

A rotary light mounting 31 includes a reduced cylindrical portion 30 rotatably fitted within the enlarged end of the bushing 34. The enlarged end of the light mounting 31 extends beyond the corresponding end of the handle 7 so that the light mounting may be gripped by the hand and rotated relative to the bushing 34. A light bulb or lamp embodying a straight filament 29 of the type shown in Figure 1 is properly located in the extreme forward end of the reduced portion 30 of the light mounting and in axial alinement with the lenses 25, 26.

Arranged in the light mounting rearwardly of the light bulb is an electrode 32 together with supplemental current supply wires 33 all properly encased within suitable insulating material as shown.

Obviously, then, by rotating the finger grip 19, lens carrier 24, and lamp mounting 31, may be simultaneously rotated as may be found desirable, and further, the lamp mounting 31 may be also rotated independently of the carrier 24 without varying the distance between lenses 25, 26 and the lamp.

To vary the distance between the lenses 25, 26, and the lamp, there is slidably mounted on the handle 7 between the opposed longitudinal edges of hand grip 8 a finger head 38 having integral therewith a plate 39 slidably confined between the handle 7 and an elongated narrow confining plate 40, the latter being suitably secured to the handle.

Extension 39 is provided with a pin or projection 41 operable in a slot 42 provided therefor in handle 7. The inner end of the pin or projection 41 engages the shoulder 43 of the bushing 34. Obviously, by engaging the finger with the member 38, the extension 39 may be urged toward the right in Figure 1, thus moving bushing 34 in a corresponding direction, effecting a movement of the lamp axially of the handle and in a direction away from the lenses in the carrier 24.

From the foregoing then, it will be seen that the invention provides for a neat and compact arrangement including as essential parts of the device, a lamp provided with a straight filament, spherical and cylindrical lenses in axial alinement with one another and with the light, and so arranged that the lenses may be rotated simultaneously with the lamp, or independently of the lamp while the lamp also may be rotated independently of the lenses and further may be moved axially relative to the lenses toward or away from the latter for varying the relative position of the lenses and the lamp, thus insuring the attaining of a perfect hairline streak of light so that one may measure the errors of refraction in any meridian one at a time (according to the laws of refraction,) and will attain the spherical cylindrical axis in astigmatism of the human eye.

A further advantage of the present invention is also that in similar instruments, all the different meridians are lit up at the same time, whereas, according to my invention, one may light up one meridian at a time. The device will be found especially adaptable for measuring the errors of refraction of children, of the deaf, and the dumb, since the operator of the device need not rely on questioning the patient when using the device.

Still another important feature of the present invention is in the provision of such a compact arrangement of parts that the finger grip 19 and the finger head 38 are so arranged adjacent to one another that they may be engaged by one of the fingers of the hand gripping the handle, thus enabling adjustment without requiring the use of the other hand.

Even though I have herein shown and described the preferred embodiment of the invention, it is to be understood that the same is susceptible to various modifications, improvements and changes coming within the scope of the appended claims.

Having thus described my invention, what I claim as new is:—

1. A refractometer including in combination a tube, a sleeve rotatably mounted therein, a lens carrier mounted in the sleeve for movement therewith, a bushing rotatably and slidably mounted in said tube, a lamp mounted in the bushing in axial alinement with said lens carrier, means operable from the exterior of the tube for simultaneously rotating said lens carrier and the bushing, other means independently of the first means for effecting an axial movement of the bushing relative to the lens carrier for varying the distance between the lens carrier and the lamp, and additional means for rotating the lamp and moving the latter axially of the bushing respectively.

2. A refractometer including in combination, a tubular member, a pair of telescoping members arranged in the first member, a lens carrier arranged in one of said telescoping members, a lamp mounting arranged in the other of said telescoping members, means operable from the exterior of the tubular member for simultaneously rotating said telescoping members, other means operable from the exterior of the tubular member for moving one of said telescoping members relative to the other of said telescoping members to vary the distance between the lens carrier and the lamp mounting, said lamp mounting being arranged in the last referred to telescoping member for rotatable and sliding movement respectively relative to said one telescoping member, and both of said means respectively provided with a finger grip, said finger grips being arranged adjacent one to the other, whereby may be effected an actuation of each of said means by a finger of the hand gripping said tubular member.

3. In a refractometer a rotatably mounted tubular member, a lens carrier arranged in said tubular member for movement therewith, a bushing provided with a reduced extension receivable in one end of said rotatable member, said reduced end of said bushing provided with a pin receivable in a slot provided therefor in said rotatable member, other means for effecting a sliding movement of said bushing relative to said rotatable member, and a lamp mounting arranged in said bushing for sliding and rotating movements respectively relative to said bushing.

4. A refractometer including in combination a pair of telescoping members, means for effecting a simultaneous rotation of said members, a lens carrier arranged in one of said telescoping members for rotative movement therewith, a lamp mounted in the other of said telescoping members for rotation therewith, and means independently of the first mentioned means for moving one of said telescoping members axially relative to the other of said telescoping members for varying the distance between said lens carrier and said lamp.

In testimony whereof I affix my signature.

ERNEST N. BROWN.